United States Patent
Yoshikawa (10) Patent No.: US 9,858,508 B2
(45) Date of Patent: Jan. 2, 2018

(54) DOT RECORDING APPARATUS, DOT RECORDING METHOD, COMPUTER PROGRAM THEREFOR, AND METHOD OF MANUFACTURING RECORDING MEDIUM

(71) Applicant: Seiko Epson Corporation, Tokyo (JP)

(72) Inventor: Eishin Yoshikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/067,957

(22) Filed: Mar. 11, 2016

(65) Prior Publication Data
US 2016/0263909 A1 Sep. 15, 2016

(30) Foreign Application Priority Data
Mar. 13, 2015 (JP) .................. 2015-050538

(51) Int. Cl.
*G06K 15/10* (2006.01)
*H04N 1/047* (2006.01)
*B41J 2/21* (2006.01)

(52) U.S. Cl.
CPC .......... *G06K 15/107* (2013.01); *B41J 2/2132* (2013.01); *G06K 15/105* (2013.01); *H04N 1/047* (2013.01)

(58) Field of Classification Search
CPC ................ G06K 15/107; B41J 2/2132
See application file for complete search history.

(56) References Cited

U.S. PATENT DOCUMENTS

| 4,367,482 A * | 1/1983 | Heinzl .................. B41J 2/2132 347/40 |
| 5,633,663 A | 5/1997 | Matsubara et al. |
| 5,847,721 A * | 12/1998 | Ogata .................... B41J 2/2132 347/41 |
| 2007/0236745 A1 | 10/2007 | Noguchi et al. |
| 2011/0261099 A1* | 10/2011 | Miyashita ............. B41J 2/2132 347/12 |
| 2011/0261100 A1* | 10/2011 | Miyashita ............. B41J 2/2132 347/12 |

(Continued)

FOREIGN PATENT DOCUMENTS

| JP | 06-022106 A | 1/1994 |
| JP | 08-244253 A | 9/1996 |
| JP | 2007-306550 A | 11/2007 |

(Continued)

*Primary Examiner* — Bradley Thies
(74) *Attorney, Agent, or Firm* — Global IP Counselors, LLP (57) ABSTRACT

A dot recording apparatus performs multi-pass recording through which recording of dots is terminated in main scanning passes of N times (N is an integer equal to or greater than two) on a main scanning line, the multi-pass recording is performed for respective supercell regions defined as a region including pixel positions on which recording of dots is performed in each main pass, a first supercell region recorded in a first pass in the supercell regions is configured with a first concave polygon having a concave portion and a convex portion, a second supercell region recorded in a second pass in the supercell regions is configured with a second concave polygon having a concave portion and a convex portion, and shapes of the first concave polygon and the second concave polygon are inversely symmetrical shapes in the main scanning direction.

4 Claims, 11 Drawing Sheets

(56) References Cited

U.S. PATENT DOCUMENTS

2015/0015626 A1* 1/2015 Kayahara ............... B41J 2/2132
                                                                                                347/9

FOREIGN PATENT DOCUMENTS

| JP | 2008-307722 A | 12/2008 |
| JP | 2011-230295 A | 11/2011 |
| JP | 2015-016671 A | 1/2015 |

* cited by examiner

FIG. 4B
ODD-NUMBERED PASS

FIG. 4C
EVEN-NUMBERED PASS

FIG. 5A  FIRST PASS (● →)

FIG. 5B  SECOND PASS (○ ←)

FIG. 5C  THIRD PASS (■ →)

FIG. 6A  FIRST PASS (● →)

FIG. 6B  SECOND PASS (○ ←)

FIG. 6C  THIRD PASS (● →)

FIG. 10A
FIRST PASS

FIG. 10B
SECOND PASS

FIG. 10C
THIRD PASS

DOT RECORDING APPARATUS, DOT RECORDING METHOD, COMPUTER PROGRAM THEREFOR, AND METHOD OF MANUFACTURING RECORDING MEDIUM

BACKGROUND

1. Technical Field

The invention relates to a dot recording apparatus, a dot recording method, a computer program therefor, and a method of manufacturing a recording medium.

2. Related Art

A recording apparatus that reciprocates a plurality of recording heads for discharging ink of different colors on a recording material, and performs recording by performing main scanning when reciprocating, has known as a dot recording apparatus (for example, JP-A-6-22106). In this recording apparatus, pixel groups configured with m×n pixels are arranged so as to be not adjacent to each other within a region on which images can be recorded by one main scanning. In addition, recording is completed by performing a plurality of times of the main scanning using a plurality of thinning patterns in complimentary sequence relationships with each other.

In the beginning of recording of dots, dots are recorded in a state where there is no vibration of a recording head. However, at the end of the hitting of dots, since dots are hit in a state where vibration of a recording head caused by recording of another dot is remained, it is known that ejecting states of ink are different in the beginning and at the end of the recording of the dots. In JP-A-6-22106, there has been a problem that the color streaks can be easily noticeable because the length of a sub-scanning direction of each pixel group is a length of a sub-scanning direction in a region where the beginning portion of the hitting of dots in a first pass and the beginning portion of the hitting of dots in a second pass are adjacent to each other, and the length of a sub-scanning direction of each pixel group is the length of a sub-scanning direction in a region in which an end portion of the hitting of dots in the first pass and an end portion of the hitting of dots in the second pass are adjacent to each other, when each pixel group is recorded. Such a problem is not limited to a recording apparatus, and has been a problem that is common in the dot recording apparatus for recording dots on a recording medium (dot recording medium).

SUMMARY

The invention can be realized in the following aspects or application examples.

(1) According to an aspect of the invention, there is provided a dot recording apparatus including a recording head having a plurality of nozzles; a main scanning driving mechanism that performs main scanning pass for forming dots on a recording medium while relatively moving the recording head and the recording medium in a main scanning direction; a sub-scanning driving mechanism that performs sub-scanning for relatively moving the recording medium and the recording head in a sub-scanning direction intersected with the main scanning direction; and a controller that controls the recording head, the main scanning driving mechanism, and the sub-scanning driving mechanism. The controller performs multi-pass recording through which recording of dots is terminated in main scanning pass of N times (N is an integer equal to or greater than two) on a main scanning line. The multi-pass recording is performed for respective supercell regions defined as a region including pixel positions on which recording of dots is performed in each main pass. A first supercell region recorded in a first pass among the supercell regions is configured with a first concave polygon having a concave portion and a convex portion, a second supercell region recorded in a second pass among the supercell regions is configured with a second concave polygon having a concave portion and a convex portion. Shapes of the first concave polygon and the second concave polygon are inversely symmetrical shapes in the main scanning direction. According to the dot recording apparatus in this aspect, since the beginning regions of each main scanning pass are not adjacent to the sub-scanning direction, it is possible that the color streaks are less noticeable.

(2) In the recording apparatus of the aspect, boundary lines of two supercell regions adjacent to each other among the supercell regions may include a boundary line portion not parallel to any one of the main scanning direction and the sub-scanning direction. According to the aspect, since the boundary lines of each supercell region include the boundary line portion that is not parallel to any one of the main scanning direction and the sub-scanning direction, it is possible that the banding is less noticeable compared to a case where boundary lines are configured by only the boundary line parallel to the main scanning direction and the boundary line parallel to the sub-scanning direction.

(3) In the recording apparatus of the aspect, the first concave polygon and the second concave polygon may be concave squares. Since the concave polygon is in the simplest shape of the concave polygon, it is easy to create a shape for filling the entirety of recording regions.

(4) In the recording apparatus of the aspect, the first concave polygon and the second concave polygon may have the same shape. According to this aspect, it is possible to reduce a memory requirement for defining a supercell region.

It is possible to realize various aspects of the invention, for example, a dot recording method, a computer program for creating raster data in order to perform dot recording, a storage medium that accommodates a computer program for creating raster data in order to perform dot recording, a method of manufacturing a recording medium, and a recording medium on which dots are recorded, other than the dot recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
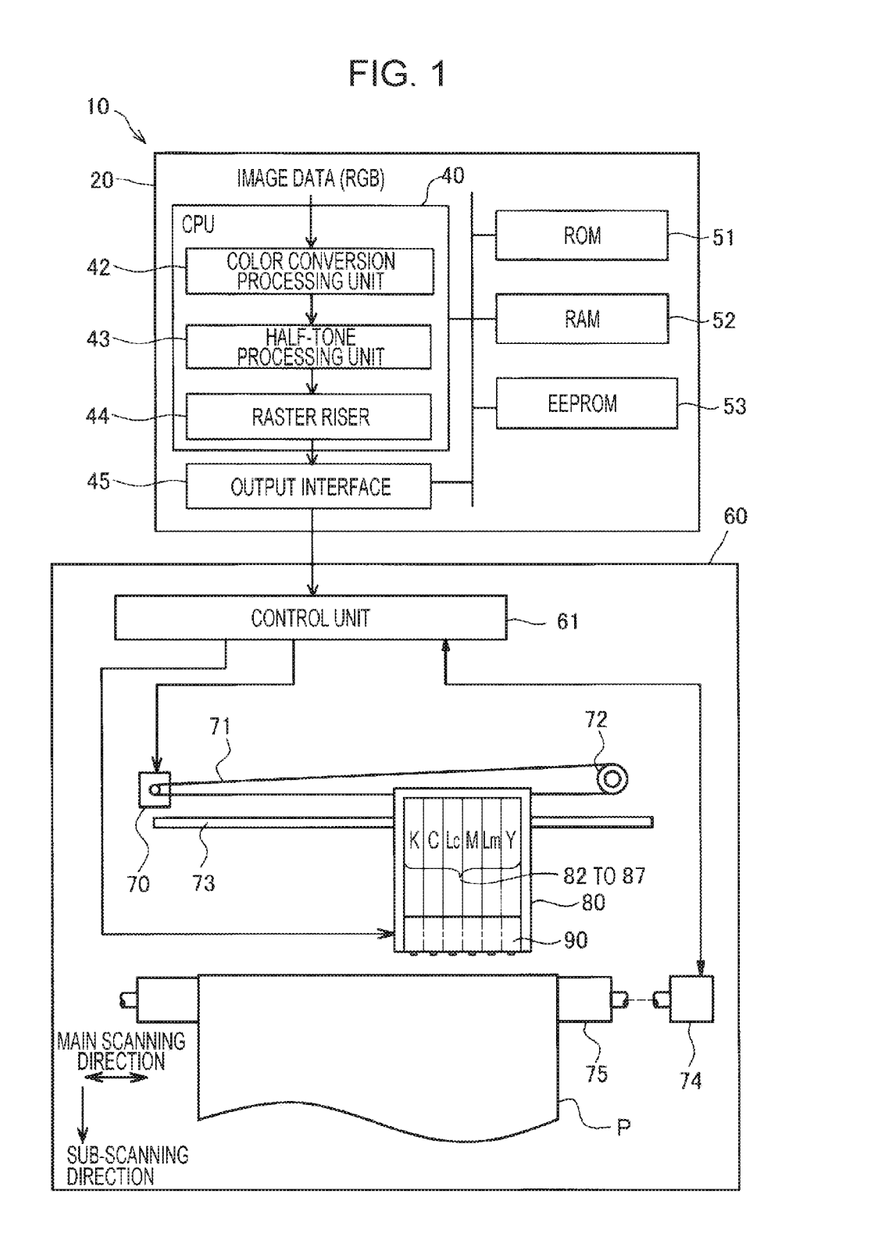
FIG. 1 is an explanatory view illustrating a configuration of a dot recording system.

FIG. 1 is an explanatory view illustrating a configuration of a dot recording system 10. The dot recording system 10 includes an image processing unit 20 and a dot recording unit 60. The image processing unit 20 generates recording data for the dot recording unit 60 from image data (for example, image data of RGB).

The image processing unit 20 includes a CPU 40 (referred to as a "controller 40"), a ROM 51, a RAM 52, an EEPROM 53, and an output interface 45. The CPU 40 has functions of a color conversion processing unit 42, a half-tone processing unit 43, and a raster riser 44. These functions are realized by a computer program. The color conversion processing unit 42 converts multi-tone RGB data of image into ink amount data that represents the amount of ink in plural colors of ink. The half-tone processing unit 43 creates dot data that represents a dot formed state for every pixel by performing half-tone processing on the ink amount data. The raster riser 44 sorts the dot data created from the half-tone processing as dot data used in each main scanning by the dot recording unit 60. Hereinafter, the dot data for each main scanning generated by the raster riser 44 is referred to as "raster data". The operation of the following dot recording described in various embodiments is a rasterization operation (that is, operation represented by raster data) realized by the raster riser 44.

The dot recording unit 60 is, for example, a serial type ink jet recording apparatus, and includes a control unit 61, a carriage motor 70, a driving belt 71, a pulley 72, a sliding shaft 73, a paper feed motor 74, a paper feed roller 75, a carriage 80, ink cartridges 82 to 87, and a recording head 90.

The driving belt 71 is stretched between the carriage motor 70 and the pulley 72. The carriage 80 is attached to the driving belt 71. For example, the ink cartridges 82 to 87 in which cyan ink (C), magenta ink (M), yellow ink (Y), black ink (K), light cyan ink (Lc), and light magenta ink (Lm) are respectively accommodated are mounted on the carriage 80. In addition, it is possible to use ink of various types other than these examples as the ink. A nozzle array corresponding to the ink of each of the above colors is formed in the recording head 90 at a lower portion of the carriage 80. It is possible to supply the ink from each of the ink cartridge to the recording head 90 when these ink cartridges 82 to 87 are installed in the carriage 80 from the above. The sliding shaft 73 is arranged in parallel with the driving belt 71, and penetrates the carriage 80.

The carriage 80 moves along the sliding shaft 73 when the carriage motor 70 drives the driving belt 71. This direction is referred to as a "main scanning direction". The carriage motor 70, the driving belt 71, and the sliding shaft 73 constitute a main scanning driving mechanism. The ink cartridges 82 to 87 and the recording head 90 also move in the main scanning direction with the movement of the carriage 80 in the main scanning direction. Dot recording on a recording medium P is performed by ejecting the ink from nozzles (described later) disposed in the recording head 90 on the recording medium P (typically recording paper) when moving in this main scanning direction. In this manner, the movement to the main scanning direction and the ejection of the ink of the recording head 90 are referred to as main scanning, and one main scanning is referred to as "main scanning pass" or simply "pass".

The paper feed roller 75 is connected to the paper feed motor 74. The recording medium P is inserted onto the paper feed roller 75 when recording. The control unit 61 rotates the paper feed motor 74 when the carriage 80 moves up to an end portion of the main scanning direction. With this, the paper feed roller 75 is also rotated and moves the recording medium P. The relative movement direction between the recording medium P and the recording head 90 is referred to as a "sub-scanning direction". The paper feed motor 74 and the paper feed roller 75 constitute a sub-scanning driving mechanism. The sub-scanning direction is a direction (orthogonal direction) perpendicular to the main scanning direction. However, the sub-scanning direction and the main scanning direction are not necessary to be perpendicular to each other, and may be crossed with each other. In many cases, a main scanning operation and a sub-scanning operation are alternately performed. In addition, it is possible to perform at least one of a unidirectional recording operation to perform the dot recording only in the forward of the main scanning, and a bidirectional recording operation to perform the dot recording in the forward and backward direction of the main scanning. Since the main scanning in the forward direction and the main scanning in the backward direction are reversed only in the direction of the main scanning, the main scanning in the forward direction and the main scanning in the backward direction will be described without particularly discriminating between the forward and the backward directions in the following description.

The image processing unit 20 may be integrally formed with the dot recording unit 60. In addition, the image processing unit 20 may be separately formed with the dot recording unit 60 by accommodating the image processing unit 20 in a computer (not illustrated). In this case, the image processing unit 20 may be executed by a CPU as printer driver software (computer program) on the computer.

Figure 2:
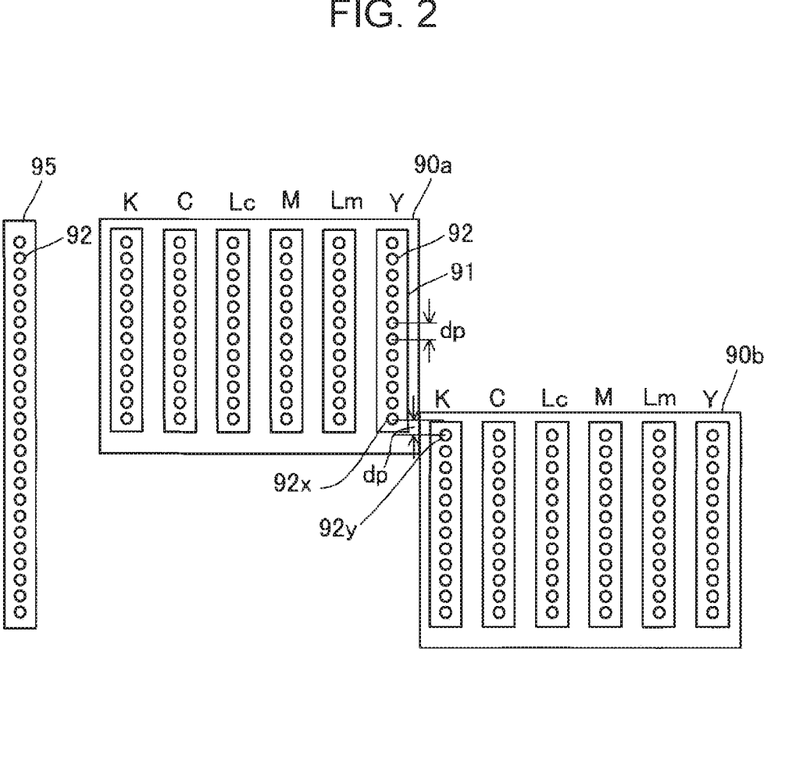
FIG. 2 is an explanatory view illustrating an example of a configuration of a nozzle array of a recording head.

FIG. 2 is an explanatory view illustrating an example of a configuration of a nozzle array of the recording head 90. In FIG. 2, the two recording heads 90 are illustrated as. However, the recording head 90 may be one or equal to or greater than two. The two recording heads 90a and 90b include nozzle arrays 91 for every color. Each of the nozzle arrays 91 includes a plurality of nozzles 92 arranged in the sub-scanning direction at a constant nozzle pitch dp. A nozzle 92x in an end of the nozzle array 91 of the first recording head 90a and a nozzle 92y in an end of the nozzle array 91 of a second recording head 90b are shifted only by the nozzle pitch dp to the sub-scanning direction in the nozzle array 91. In this case, a nozzle array for one color of the two recording heads 90a and 90b are equivalent to a nozzle array 95 (illustrated on the left side of FIG. 2) having the number of nozzles two times the number of nozzles for one color of one recording head 90. In the following description, a method for performing dot recording for one color will be described using the equivalent nozzle array 95.

In addition, the nozzle pitch dp is equal to a pixel pitch on the recording medium P in a first embodiment. However, it is possible that the nozzle pitch dp is an integer multiple of the pixel pitch on the recording medium P. In a later case, so-called interlace recording (operation by which dots are recorded in second and subsequent passes so as to fill the gaps of the dots between the main scanning lines which are recorded in one pass) is performed. The nozzle pitch dp, for example, is a value (0.035 mm) corresponding to 720 dpi.

Figure 3:
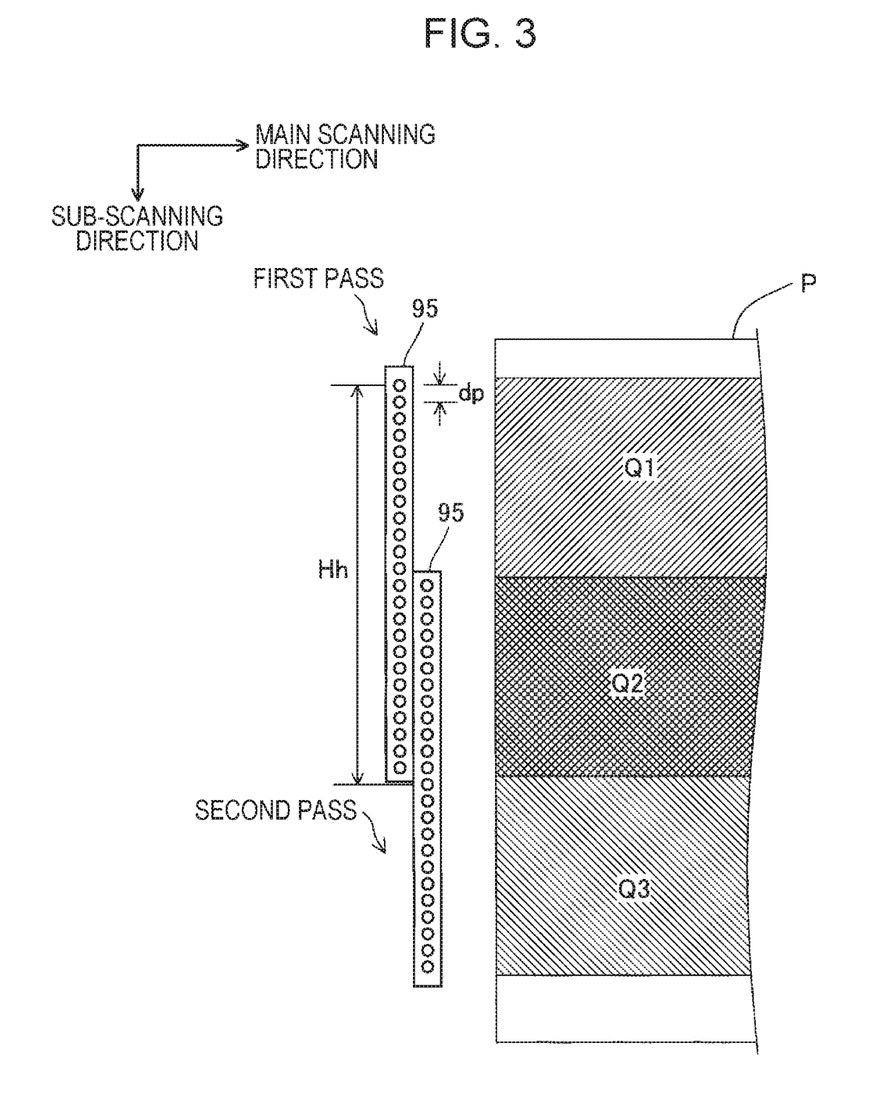
FIG. 3 is an explanatory view illustrating a position of the nozzle array and a recording region in the position in two main scanning passes of dot recording according to a first embodiment.

FIG. 3 is an explanatory view illustrating the position of the nozzle array 95 and a recording region in the position in two main scanning passes of dot recording according to the first embodiment. In the following description, a case where dots are formed on the entirety of pixels of the recording medium P using one color ink (for example, cyan ink) will be described as an example. In the present specification, dot recording in which main scanning passes (simply referred to as a "pass") of N times (N is an integer equal to or greater than two) are terminated is referred to as "multi-pass recording" in order to form dots on each main scanning line. In the present embodiment, the number of passes N of the multi-pass recording is two. A position of the nozzle array 95 is shifted in the sub-scanning direction by a distance corresponding to half of a head height Hh in a first pass ((n+1)-th pass (n is an integer equal to or greater than zero)) (1 P) and a second pass ((n+2)-th pass) (2 P). Here, the "head height Hh" means a distance that is represented as M×dp (M is the number of nozzles of the nozzle array 95 and dp is the nozzle pitch).

In the (n+1)-th pass, recording of dots are performed on a part of the entirety of the pixels in a region Q1 configured on the main scanning line where nozzles of an upper half portion of the nozzle array 95 pass through and a part of the entirety of the pixels in a region Q2 configured on the main scanning line where nozzles of a lower half portion of the nozzle array 95 pass through on the recording medium P. In the (n+2)-th pass, recording of dots are performed on the rest pixels where dots are not formed in the (n+1)-th pass among the entirety of the pixels in the region Q2 configured on the main scanning line where nozzles of an upper half portion of the nozzle array 95 pass through and a part of the entirety of the pixels in a region Q3 configured on the main scanning line where nozzles of a lower half portion of the nozzle array 95 pass through on the recording medium P. Accordingly, a total of 100% of recording of pixels is performed through the (n+1)-th pass and the (n+2)-th pass in the region Q2. In addition, in the (n+3)-th pass, dots are formed on the rest of the pixels in the region Q3 and a part of the pixels in the following region Q4 (not illustrated). In addition, although a case in which images forming dots (solid image) on the entirety of the pixels of the recording medium P is formed on the recording medium P is assumed, recording images represented as actual dot data include pixels for actually forming dots on the recording medium P and pixels for not actually forming dots on the recording medium P. That is, whether or not dots are actually formed on each pixel of the recording medium P is determined by dot data that is generated by half-tone processing. In the present specification, a term referred to as "dot recording" means "to perform formation or non-formation of dots". In addition, a term referred to as "performing dot recording" does not indicate any difference between whether or not dots are actually formed on the recording medium P, and is used as a term that means "corresponding to dot recording".

Figure 4A:
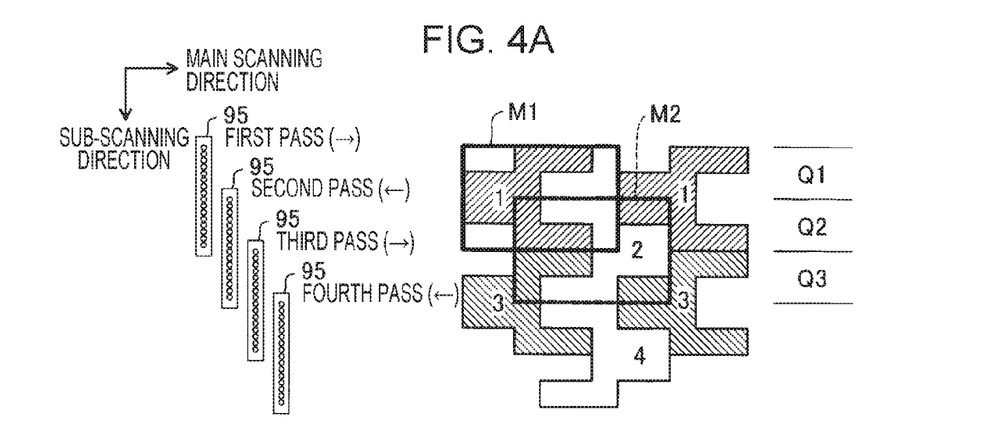
FIGS. 4A to 4C are explanatory views illustrating a dot recording pattern and a mask for creating the dot recording pattern according to the first embodiment.
Figure 4B:
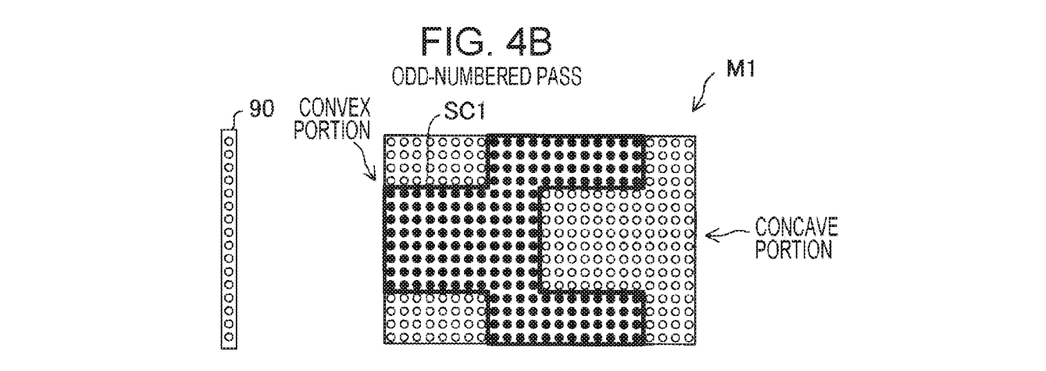
Figure 4C:
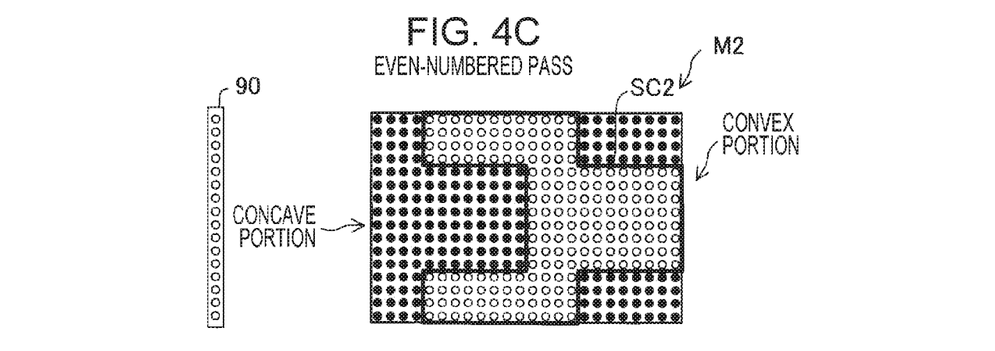

FIGS. 4A to 4C are explanatory views illustrating a dot recording pattern and a mask for creating the dot recording pattern according to the first embodiment. FIG. 4A illustrates positions of the nozzle array 95 in the first pass to a fourth pass and regions recorded in each pass. In the FIG. 4A, numbers represent an order of a pass, regions recorded in odd-numbered passes are hatched, and regions recorded in even-numbered passes are not hatched.

FIG. 4B illustrates an example of a mask M1 and a dot pattern thereof used in recording of the odd-numbered passes. In this embodiment, the mask M1 is configured with a size of 24 dots in the main scanning direction and a size of 16 dots in the sub-scanning direction. In addition, the number of dots 16 of the mask M1 in the sub-scanning direction is the same as the number of nozzles 92 of the nozzle array 95 in FIG. 2. A size of the mask M1 in the main scanning direction is defined according to a repeated shape and a repeated size. Dots represented as black dots of FIG. 4B are dots to be recorded in a corresponding pass, and white dots are dots to be recorded in a pass before the corresponding pass or after the corresponding pass. A group represented as the black dots has a concave polygon having a convex portion on the left side and a concave portion on the right side. In this embodiment, a region of the concave polygon is referred to as a "first supercell region SC1". The term of the "supercell region" means a region of a specific shape formed as multiple pixels, and is defined as a region including pixel positions on which dots are recorded in one pass. In addition, in this embodiment, four dots of the right side of the mask M1 are not recorded in the odd-numbered passes. This is a reason why a region, on which dots are not recorded between the end of recording in application of a mask M1 and the beginning of recording in the following application of the mask M1, is generated. In addition, dots are recorded on this region by using a mask M2 described later.

FIG. 4C illustrates an example of a mask M2 and a dot pattern thereof used in recording of the even-numbered passes. The mask M2 has a size of 24 dots in the main scanning direction and a size of 16 dots in the sub-scanning direction, similar to the mask M1. Dots represented as white dots in FIG. 4C are dots to be recorded in a pass, and black dots are dots to be recorded in a pass before the pass or after the pass. A group represented as the white dots has a concave polygon having a convex portion on the right side and a concave portion on the left side. In this embodiment, a region of the concave polygon is referred as to a "second supercell region SC2". The first supercell region SC1 and the second supercell region SC2 have the same shape and the shapes thereof are inversely symmetrical shapes in the main scanning direction.

Figure 5A:
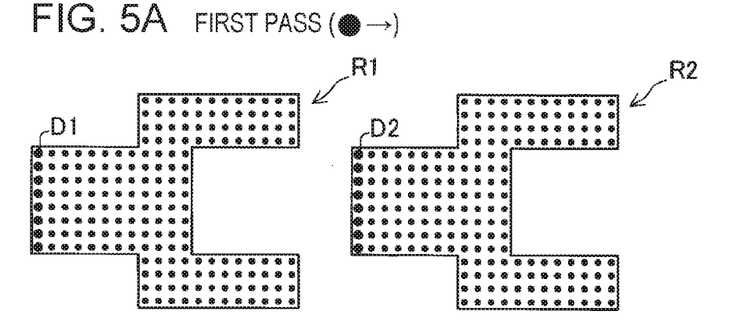
FIGS. 5A to 5C are explanatory views illustrating dots recorded in each pass from a first pass to a third pass.
Figure 5B:
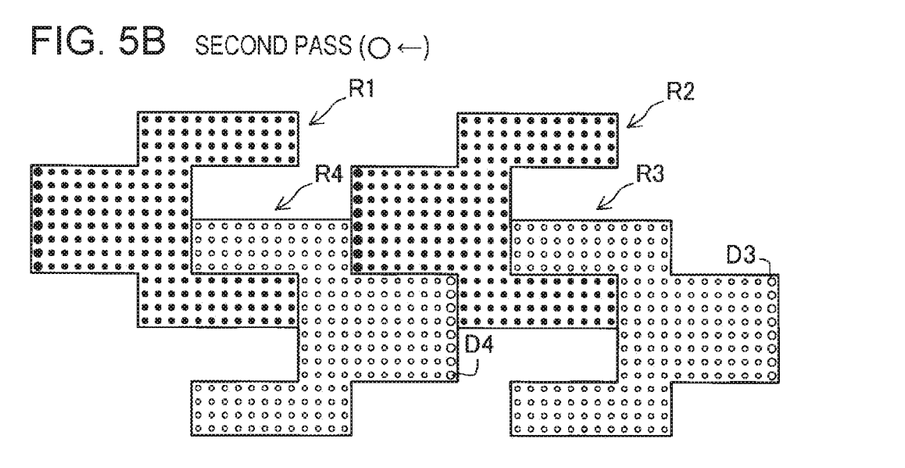
Figure 5C:
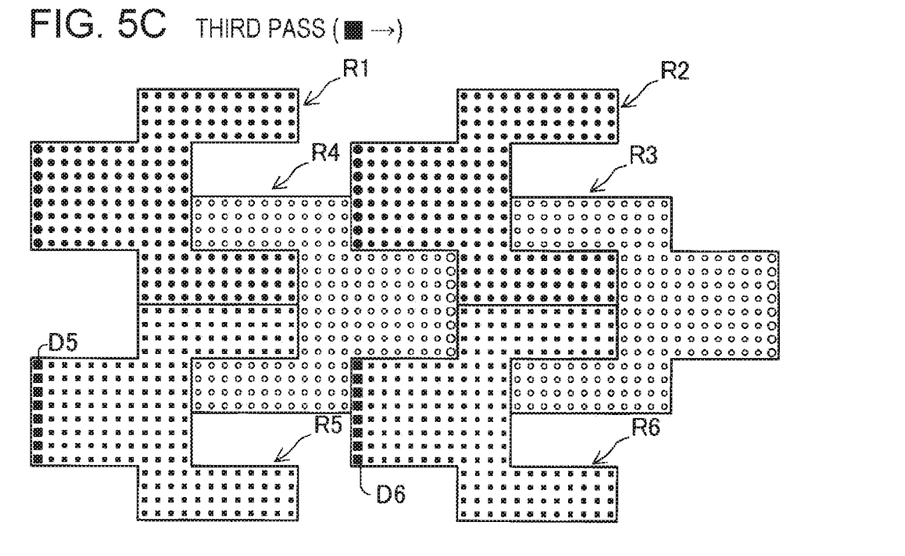

FIGS. 5A to 5C are explanatory views illustrating dots recorded in each pass from a first pass to a third pass. FIG. 5A illustrates a state after recording dots in the first pass, and two regions R1 and R2 recorded. In the regions R1 and R2, sizes of dots D1 and D2 to be recorded first in each region are largely illustrated. Dots D1 and D2 to be recorded first in each of supercell regions SC1 and SC2 are recorded in a state where the nozzle array 95 (recording head 90) is not vibrated. However, the second and subsequent dots are recorded in a state where the nozzle array 95 (recording head 90) is vibrated by recording the previous dots. Accordingly, there is a case that ejecting amounts of ink from the nozzle are different between the first recorded dot D1 and the second and subsequent dots. For this reason, the sizes of the dots D1 and D2 are changed.

FIG. 5B illustrates a state after recording dots in the second pass. In the second pass, two regions R3 and R4 are recorded. In the region R3 and R4, sizes of dots D3 and D4 to be recorded first in each region are largely illustrated.

FIG. 5C illustrates a state after recording dots in the third pass. Since dots in the third pass are illustrated as black square dots in order to distinguish from dots (black dots) in the first pass. In the third pass, two regions R5 and R6 are recorded. In the regions R5 and R6, sizes of dots D5 and D6 to be recorded first in each region are largely illustrated.

As known from FIG. 5C, dots D1 to D6 to be recorded first in regions R1 to R6 of six regions are not adjacent to each other. For this reason, it is possible that the color streaks are less noticeable.

Figure 6A:
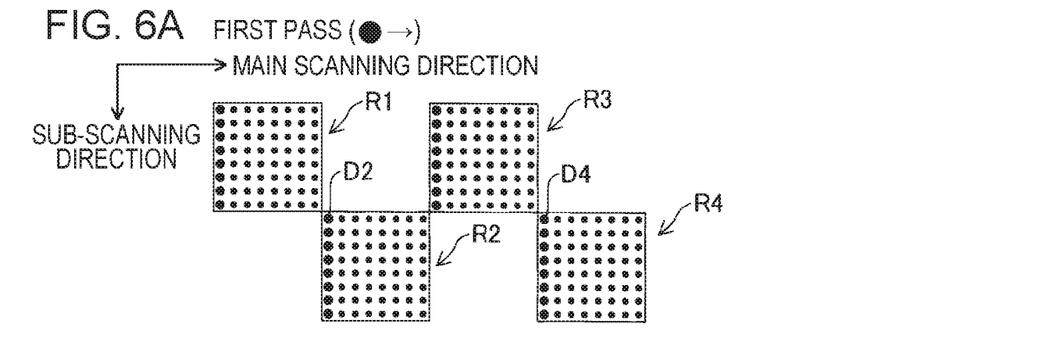
FIGS. 6A to 6C are explanatory views illustrating dots recorded in each pass from the first pass to the third pass in a comparative example.
Figure 6B:
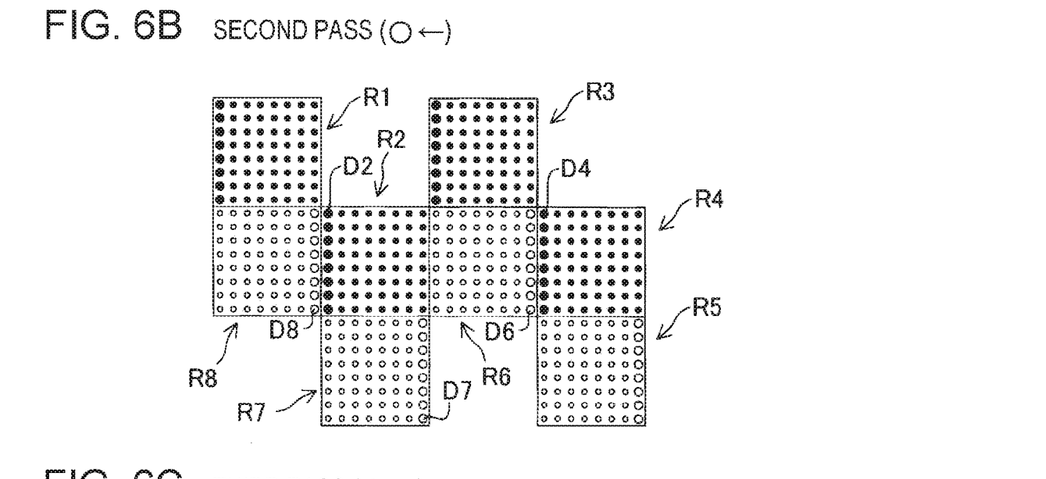
Figure 6C:
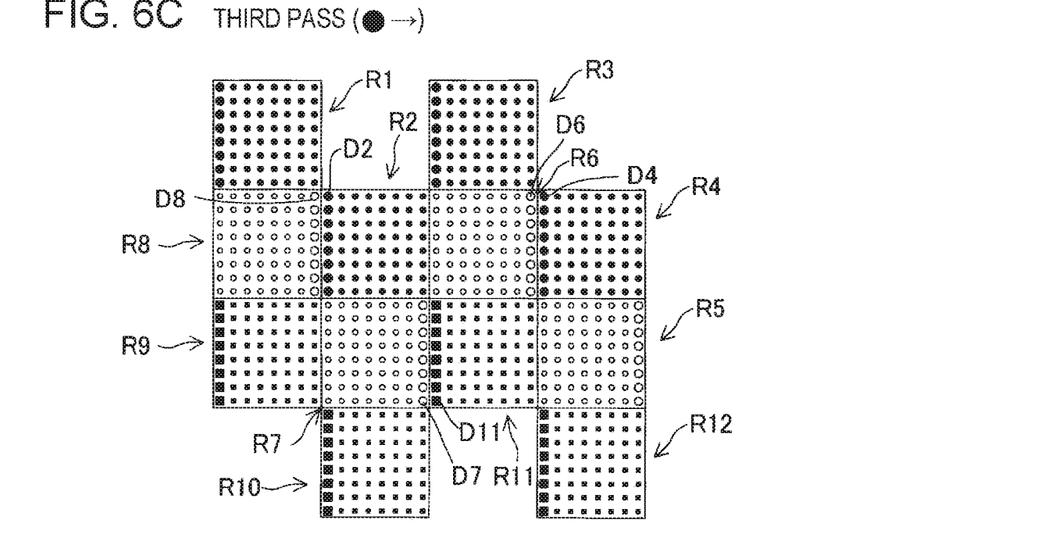

FIGS. 6A to 6C are explanatory views illustrating dots recorded in each pass from the first pass to the third pass in a comparative example. FIG. 6A illustrates a state after recording dots on regions R1 to R4 in the first pass, FIG. 6B illustrates a state after recording dots on regions R5 to R8 in the second pass, and FIG. 6C illustrates a state after recording dots on regions R9 to R12 in the third pass. In the comparative example, dots D2 in the region R2 and dots D8 in the region R8 are adjacent to each other, dots D4 in the region R4 and dots D6 in the region R6 are adjacent to each other, and dots D7 in the region R7 and dots D11 in the region R11 are adjacent to each other. For this reason, in the comparative example, it is said that the color streaks are noticeable, when comparing to the first embodiment.

As described above, according to the first embodiment, since a first supercell region SC1 that is recorded in the first pass among the supercell regions includes a first concave polygon having a concave portion and a convex portion, a second supercell region SC2 that is recorded in the second pass among the supercell regions includes a second concave polygon having a concave portion and a convex portion, and the first concave polygon and the second concave polygon are inversely symmetrical shapes in the main scanning direction, regions where recording start are not adjacent to each other in each of the supercell regions SC1 and SC2. For this reason, it is possible that the color streaks are less noticeable.

Second Embodiment

Figure 7A:
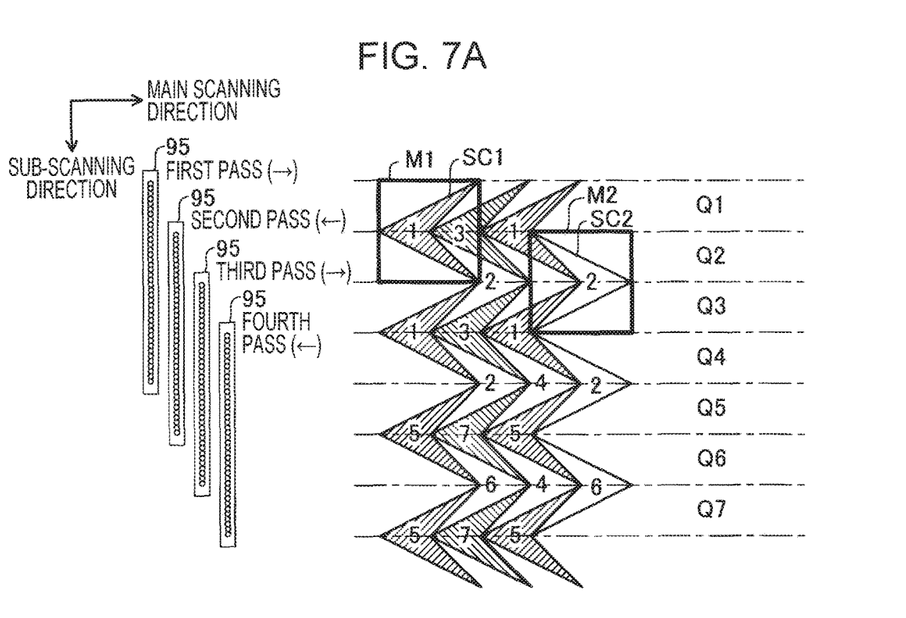
FIGS. 7A to 7C are explanatory views illustrating a dot recording pattern and a mask for creating the dot recording pattern according to a second embodiment.
Figure 7B:
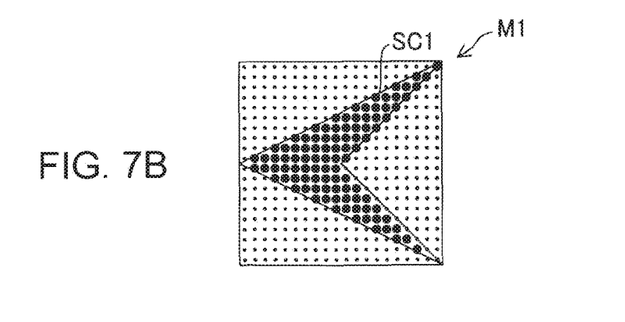
Figure 7C:
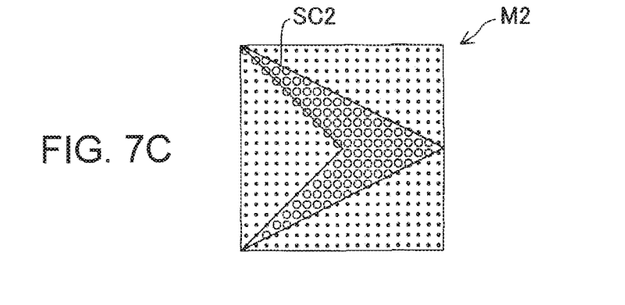

FIGS. 7A to 7C are explanatory views illustrating a dot recording pattern and a mask for creating the dot recording pattern in a second embodiment. In the second embodiment, shapes of the supercell regions SC1 and SC2 are concave polygon shapes, and the second embodiment is different from the first embodiment in that dots are recorded in four passes (hereinafter, referred to as "four pass") with respect to the first embodiment where dots are recorded in two passes (hereinafter, referred to as "two pass").

FIG. 7A illustrates positions of a recording head 90 and regions that are recorded in each pass in the first pass to the fourth pass. Numbers illustrated in FIG. 7A represent an order of a pass, as 1 is the first pass and 2 is the second pass. In addition, regions recorded in the odd-numbered passes are hatched, and regions recorded in the even-numbered passes are not hatched. A part of regions Q1 to Q4 are recorded in the first pass, a part of regions Q2 to Q5 are recorded in the second pass, a part of regions Q3 to Q6 are recorded in the third pass, and some of regions Q4 to Q7 are recorded in the fourth pass. Accordingly, dots are recorded on the entirety of the region Q4 in the passes of 4 times. The same is also applied in other regions.

FIG. 7B illustrates an example of a mask M1 and a dot pattern thereof used in recording of the odd-numbered passes. In this embodiment, the mask M1 is configured with a size of 20 dots in the main scanning direction and a size of 20 dots in the sub-scanning direction. In addition, 20 the number of dots of the mask M1 in the sub-scanning direction is the same as half of the number of nozzles 92 of the nozzle array 95 in FIG. 2. A size of the mask M1 in the main scanning direction is defined according to a repeated shape and a repeated size. A region defined by dots illustrated as black dots of FIG. 7B corresponds to the first supercell region SC1. The first supercell region SC1 has a concave polygon having a convex portion on the left side and a concave portion on the right side.

FIG. 7C illustrates an example of a mask M2 and a dot pattern thereof used in recording of the even-numbered passes. The mask M2 is configured with a size of 20 dots in the main scanning direction and a size of 20 dots in the sub-scanning direction in the same manner as the mask M1. A region defined by dots illustrated as white dots of FIG. 7C corresponds to the second supercell region SC2. The second supercell region SC2 has a concave polygon having a convex portion on the right side and a concave portion on the left side. The first supercell region SC1 and the second supercell region SC2 have the same shape, and are inversely symmetrical shapes in the main scanning direction.

Figure 8A:
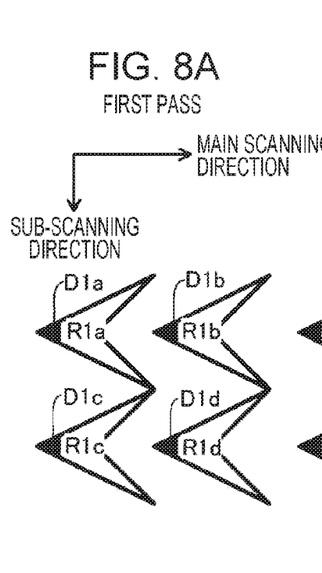
FIGS. 8A to 8D are explanatory views illustrating regions recorded in each pass from the first pass to a fourth pass.

FIGS. 8A to 8D are explanatory views illustrating regions recorded in each pass from the first pass to the fourth pass. FIG. 8A illustrates a state after recording dots in the first pass, and four regions R1a to R1d recorded. In the regions R1a to R1d, dots D1a to D1d recorded first in each region are marked as black.

Figure 8B:
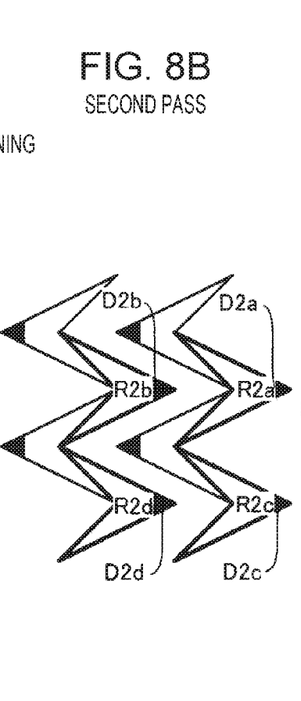
Figure 8C:
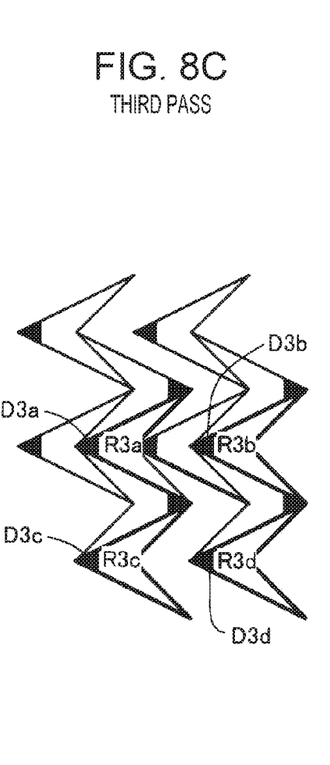
Figure 8D:
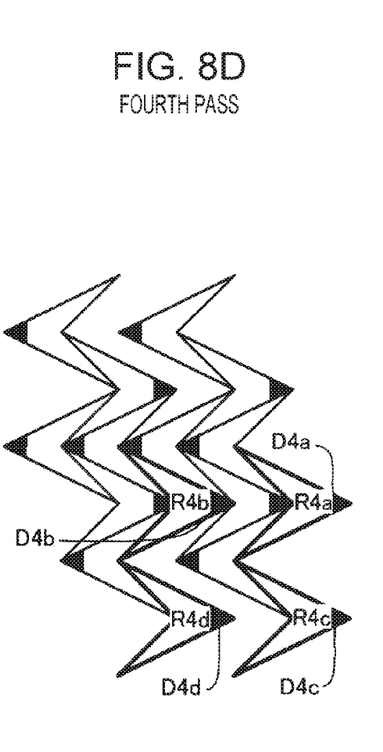

FIGS. 8B to 8D illustrate states after recording dots in the second pass, the third pass, and the fourth pass, respectively. Regions R2a to R2d are recorded in the second pass, regions R3a to R3d are recorded in the third pass, and regions R4a to R4b are recorded in the fourth pass. Thick boundary lines are illustrated in regions where dots are recorded in the pass. Dots D2a to D2d, D3a to D3d, and D4a to D4d recorded first in each region are marked as black in the same manner as the dots D1a to D1d.

As can be seen from FIGS. 8B to 8D, dots D1a to D1d, D2a to D2d, D3a to D3d, and D4a to D4d are not adjacent to one another. For this reason, it is possible that the color streaks are less noticeable. Accordingly, it is possible that the color streaks are less noticeable, similar to the first embodiment.

In the second embodiment, boundary lines of the supercell regions SC1 and SC2 have boundary line portions that are not parallel to any one of the main scanning direction and the sub-scanning direction. For this reason, it is possible that the banding is less noticeable compared to a case where the boundary lines of the supercell regions SC1 and SC2 are configured with only boundary lines parallel to the main scanning direction and boundary lines parallel to the sub-scanning direction.

In the second embodiment, a concave rectangle shape is used as a concave polygon. The concave polygon is the simplest shape among the concave shapes, and is a shape for easily creating a shape to fill the entirety of recording regions.

Third Embodiment

Figure 9A:
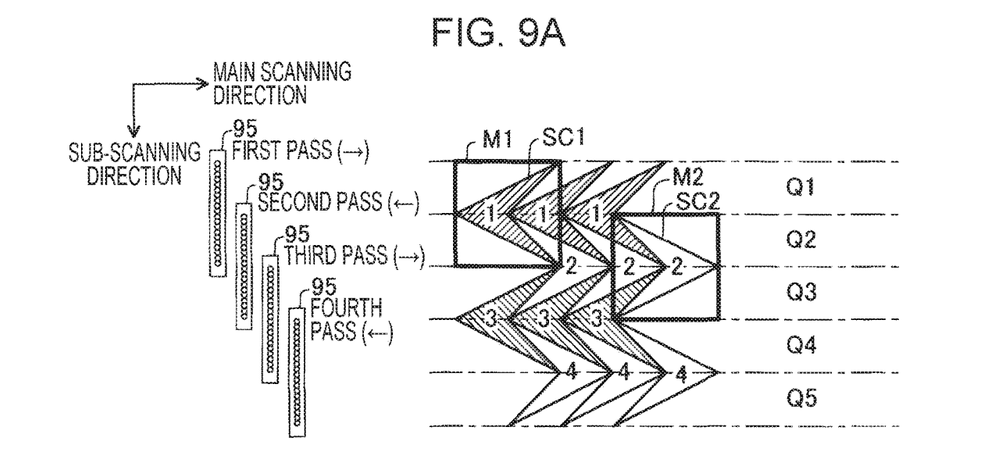
FIGS. 9A to 9C are explanatory views illustrating a dot recording pattern and a mask for creating the dot recording pattern according to a third embodiment.
Figure 9B:
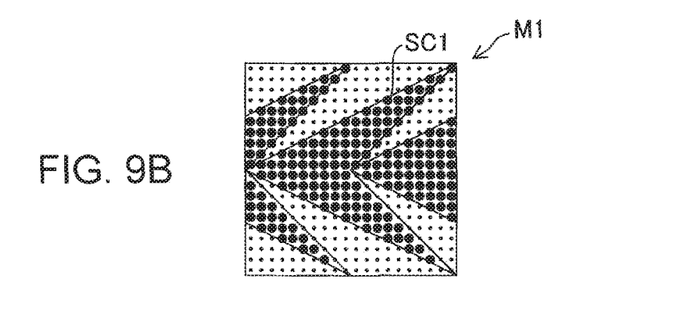
Figure 9C:
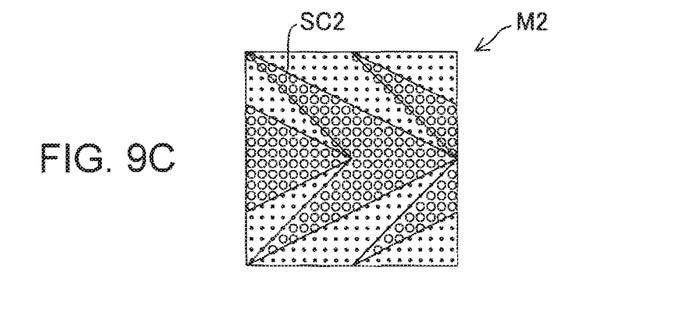

FIGS. 9A to 9C are explanatory views illustrating a dot recording pattern and a mask for creating the dot recording pattern according to a third embodiment. The third embodiment uses a common mask used in the second embodiment, but is different from the second embodiment in that it is performed in the second pass. FIG. 9A illustrates positions of the nozzle array 95 and regions recorded in each pass from the first pass to the fourth pass. Numbers of FIG. 9A represent an order of passes, and regions recorded in the odd-numbered passes are hatched, and regions recorded in the even-numbered passes are not hatched. A part of regions Q1 and Q2 are recorded in the first pass, a part of regions Q2 and Q3 are recorded in the second pass, a part of regions Q3 and Q4 are recorded in the third pass, and a part of regions Q4 and Q5 are recorded in the fourth pass.

A shape of the mask M1 in the third embodiment has a shape in which dots of a recording start portion are added to a recording end portion of the first supercell region, and dots of a recording end portion are added to a recording start portion of the first supercell region of the mask M1 of the second embodiment. The same is applied to the mask M2. In the third embodiment, the masks M1 and M2 move in the main scanning direction only by a size of the mask M1 and M2 in the main scanning direction when the mask is applied in each pass.

Figure 10A:
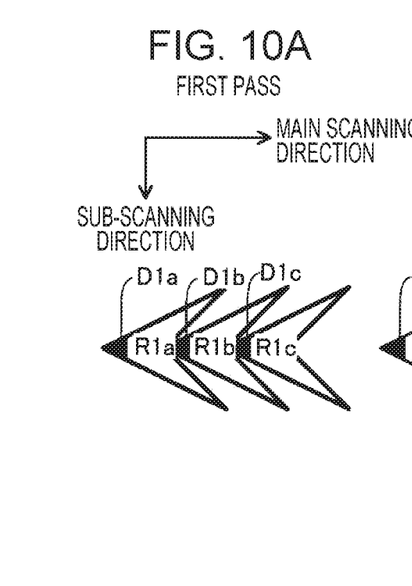
FIGS. 10A to 10C are explanatory views illustrating regions recorded in each pass from the first pass to the third pass.
Figure 10B:
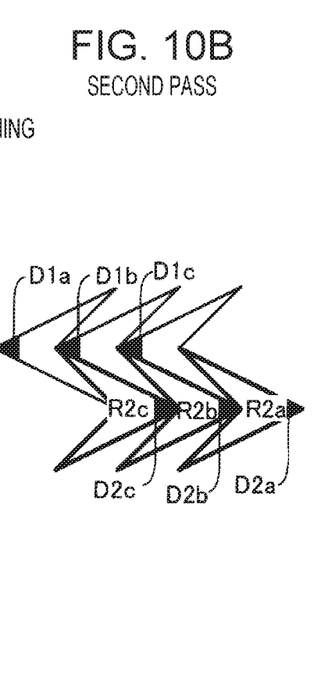
Figure 10C:
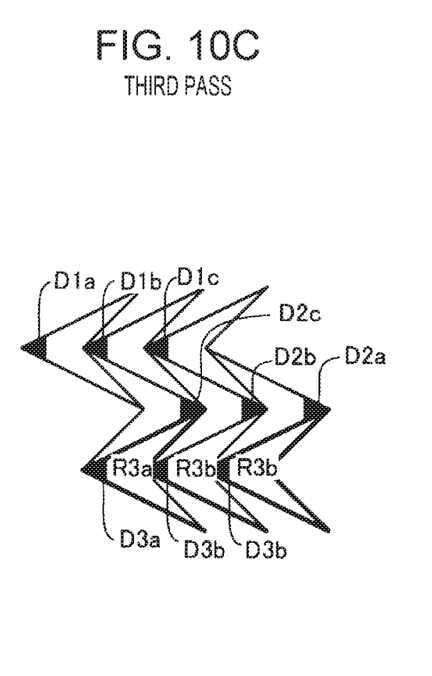

FIGS. 10A to 10C are explanatory views illustrating regions recorded in each pass from the first pass to the third pass. FIG. 10A illustrates a state after recording dots in the first pass, and three regions R1a to R1c recorded. In the regions R1a to R1c, dots D1a to D1c first recorded in each region are marked as black. FIGS. 10B and 10C illustrate states after recording dots in the second pass and the third pass, respectively. Regions R2a to R2c are recorded in the second pass, and regions R3a to R3c are recorded in the third pass. Thick boundary lines are illustrated in regions where dots are recorded in a pass. Dots D2a to D2c and D3a to D3c recorded first in each region are marked as black in the same manner as the dots D1a to D1c.

As can be seen from FIG. 10B to 10C, dots D1a to D1c, D2a to D2c, and D3a to D3c are not adjacent to one another. For this reason, it is possible that the color streaks are less noticeable. Accordingly, it is possible that the color streaks are less noticeable, similar to the first and second embodiments.

Fourth Embodiment

Figure 11A:
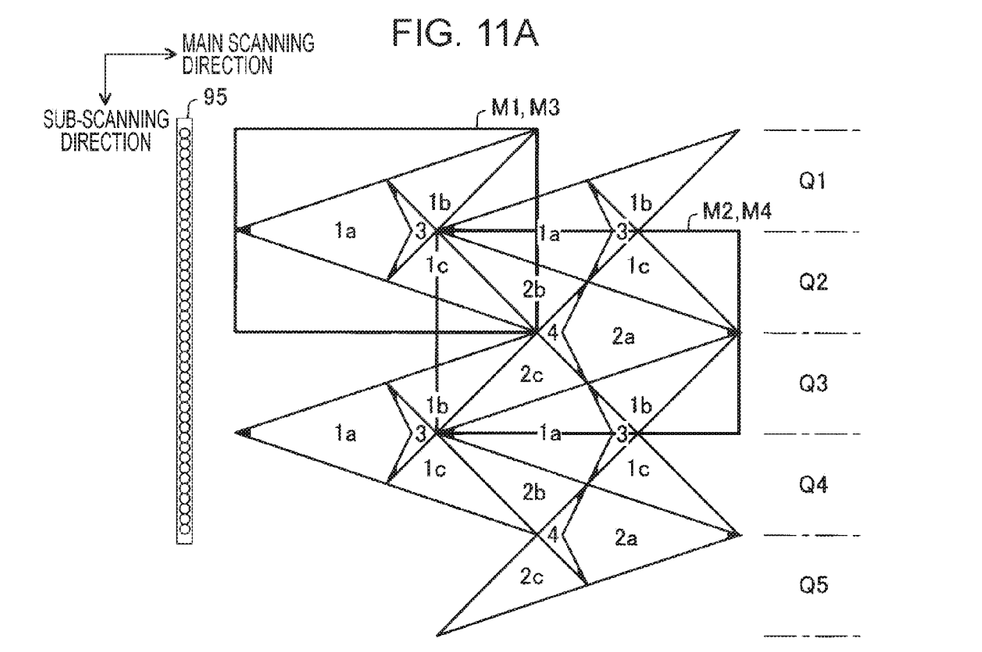
FIGS. 11A to 11C are explanatory views illustrating a dot recording pattern and a mask for creating the dot recording pattern according to a fourth embodiment.
Figure 11B:
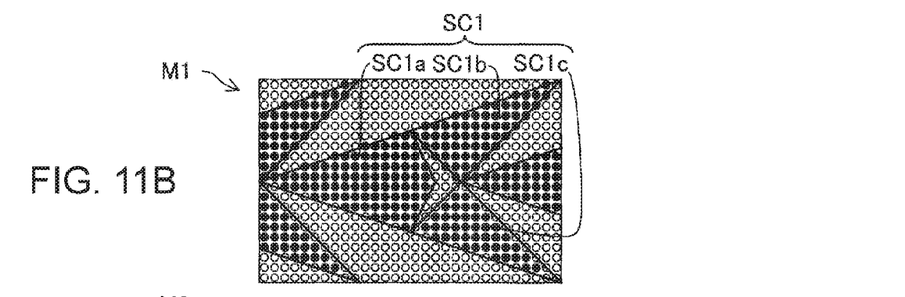
Figure 11C:
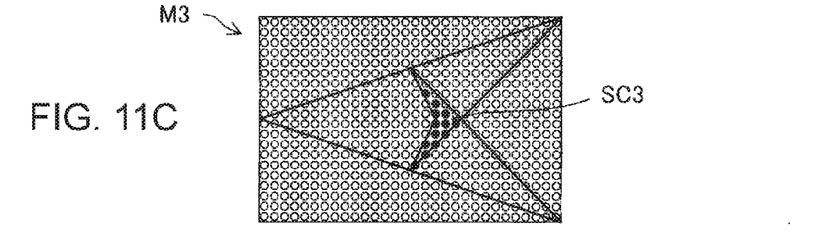

FIGS. 11A to 11C are explanatory views illustrating a dot recording pattern and a mask for creating the dot recording pattern according to a fourth embodiment. In the fourth embodiment, recording of dots is performed in four passes using four masks M1 to M4. A part of regions Q1 to Q4 are recorded using the mask M1 in the first pass, a part of regions Q2 to Q5 are recorded using the mask M2 in the second pass, a part of regions Q3 to Q5 (or Q6) are recorded using the mask M3 in the third pass, and a part of regions Q4 to Q5 (Q6 or Q7) are recorded using the mask M4 in the fourth pass. In addition, regions Q6 and Q7 are omitted for convenience of illustration.

FIG. 11B illustrates an example of the mask M1 and a dot pattern thereof. In this embodiment, the mask M1 is configured with a size of 30 dots in the main scanning direction and a size of 20 dots in the sub-scanning direction. In addition, the number of dots 20 of the mask M1 in the sub-scanning direction is the same as half of the number of nozzles 92 of the nozzle array 95 in FIG. 2. A size of the mask M1 in the main scanning direction is defined according to a repeated shape and a repeated size. Region SC1 defined by dots represented as black dots in FIG. 11B corresponds to the first supercell region. That is, in the fourth embodiment, the first supercell region SC1 defined as the mask M1 includes three partial portions SC1a, SC1b, and SC1c. The first supercell region SC1 has a shape in which a central portion of the concave rectangle shape is excluded from the concave rectangle shape. In this embodiment, the excluded shape is referred as a concave rectangle shape (concave polygon) even in the excluded shape. In addition, the description of the mask M2 is omitted. However, a shape of the mask M2 is a shape reversed from the mask M1 in the main scanning direction.

FIG. 11C illustrates an example of a mask M3 and a dot pattern thereof. In this embodiment, the mask M3 is configured with a size of 30 dots in the main scanning direction and a size of 20 dots in the sub-scanning direction. A region SC3 in which dots are recorded in the mask M3 is a region in which a concave square is excluded from the mask M1. In addition, the description of the mask M4 is omitted. However, a shape of the mask M4 is a shape reversed from the mask M3 in the main scanning direction.

In FIG. 11A, a region where dots are first recorded in each supercell region is blacked out. As can be seen in FIG. 11A, hatched regions are not adjacent to each other. Accordingly, as the fourth embodiment, even in a case where a supercell region has plural typed shapes, it is possible that the color streaks are less noticeable, similar to the first embodiment.

MODIFICATION EXAMPLE

As described above, embodiments of the invention based on several embodiments are described. However, the embodiments of the invention described above are intended to facilitate the understanding of the invention, and do not limit the invention. The invention may be modified or improved without departing from the spirit and scope of the claims, and it is a matter of course that the invention includes equivalents thereof.

First Modification Example

In the above described embodiment, the number of passes N of the multi-pass recording are two and four, and thereby the number of passes N can use a predetermined integer equal to or greater than two. In addition, it is possible to set the ratio of the dots on the each main scanning pass to a predetermined value, when the sum of ratio of dots on each main scanning line by N passes in each main scanning pass is 100%. In addition, it is preferable that positions of pixels are not overlapped with each other in the N passes of the main scanning pass. In addition, it is preferable that feed amount of sub-scanning performed after ending one main scanning pass is set as a constant value corresponding to 1/N of a height of a head.

Second Modification Example

Furthermore, in the above described embodiment, it is described that the recording head is moved in the main scanning direction. However, the invention is not limited to the above configuration when the recording medium and the recording head are relatively moved in the main scanning direction and ink is ejected. For example, the recording medium may be moved in the main scanning direction in a state where the recording head is stop. In addition, both of the recording medium and the recording head may be moved in the main scanning direction. In addition, the recording medium and the recording head may be relatively moved with respect to the sub-scanning direction. For example, as a flatbed type printer, a head unit may be moved in the X-Y direction and perform recording on a recording medium is mounted (fixed) on a table. That is, it may be configured to be relatively moved for the recording medium and the recording head in at least one of the main scanning direction and the sub-scanning direction.

Third Modification Example

In the above described embodiment, a recording apparatus that ejects ink on a recording paper is described. However, this invention can be applied to various dot recording apparatuses other than the recording apparatus, for example, also to an apparatus for forming dots by ejecting droplets on a substrate. Furthermore, it may be adopted for a liquid ejecting apparatus that ejects or discharges liquid other than ink. It may be diverted to various liquid ejecting apparatuses including a liquid ejecting head for ejecting liquid droplets of a very small amount. In addition, the liquid droplets are referred to as a state of liquid ejected from the liquid ejecting apparatus, and include shapes such as grains, tears, and filaments. In addition, the liquid referred to herein may be a material to be ejected by a liquid ejecting apparatus. For example, it may be one of states when substance is a liquid, high or low viscosity liquid state, sol, gel water, other inorganic solvents, organic solvents, solutions, liquid resins, a flow state of liquid metals (metal melt), or liquid as one state of matter, material in which particles of the functional material made of solid material such as pigment or metal particles, and the like are dissolved, and dispersed or mixed in a solvent, or the like. In addition, ink or liquid crystal or the like as described in the above embodiment can be mentioned as a typical example of the liquid. Here, the ink includes various typed liquid compositions such as general water-based ink, oil-based ink, gel ink, hot melt ink, and the like. The liquid ejecting apparatus as specific examples may be, for example, a liquid crystal display, an EL (electroluminescence) display, a surface emission display, and a liquid ejecting apparatus that ejects liquid including form of dispersed or dissolved materials such as electrode material or color material used for manufacturing color filters. In addition, the liquid ejecting apparatus may be a liquid ejecting apparatus that ejects biological organic matter used for manufacturing biochips, a liquid ejecting apparatus that ejects liquid as a specimen used as a precision pipette, a textile recording apparatus, a micro dispenser, or the like. Furthermore, a liquid ejecting apparatus that ejects lubricating oil to pinpoints of a precision machine such as a watch and a camera, a liquid ejecting apparatus that ejects transparent resin liquid such as ultraviolet curing resin and the like on a substrate in order to form a micro hemispherical lens used (optical lens) for an optical communication element or the like, and a liquid ejecting apparatus that ejects etchant such as acid, alkali, and the like for etching substrates or the like may be adopted.

The entire disclosure of Japanese Patent Application No.2015-050538, filed Mar. 13, 2015 is expressly incorporated by reference herein.

What is claimed is:

1. A dot recording apparatus comprising:
a recording head including a plurality of nozzles;
a main scanning driving mechanism that performs main scanning pass for forming dots on a recording medium while relatively moving the recording head and the recording medium in a main scanning direction;
a sub-scanning driving mechanism that performs sub-scanning for relatively moving the recording medium and the recording head in a sub-scanning direction intersected with the main scanning direction; and
a controller that controls the recording head, the main scanning driving mechanism, and the sub-scanning driving mechanism,
the controller performing multi-pass recording through which recording of dots is terminated in main scanning passes of N times (N is an integer equal to or greater than two) on a main scanning line,
the multi-pass recording being performed for respective supercell regions defined as a region including pixel positions on which recording of dots is performed in each main pass,
a first supercell region recorded in a first pass in the supercell regions being configured with a first concave quadrilateral having a concave portion and a convex portion, the concave portion being concaved in an opposite direction opposite the main scanning direction, the convex portion being convexed in the opposite direction, at least a portion of a most inner part of the concave portion of the first supercell region and at least a portion of a most outer part of the convex portion of the first supercell region being overlapped to each other as viewed in the main scanning direction,
a second supercell region recorded in a second pass in the supercell regions being configured with a second concave quadrilateral having a concave portion and a convex portion, the concave portion being concaved in the main scanning direction, the convex portion being convexed in the main scanning direction, at least a portion of a most inner part of the concave portion of the second supercell region and at least a portion of a most outer part of the convex portion of the second supercell region being overlapped to each other as viewed in the main scanning direction, and
shapes of the first concave quadrilateral and the second concave quadrilateral being inversely symmetrical shapes in the main scanning direction.

2. The dot recording apparatus according to claim 1, wherein boundary lines of two supercell regions adjacent to each other among the supercell regions include a boundary line portion not parallel to any one of the main scanning direction and the sub-scanning direction.

3. A dot recording apparatus comprising:
a recording head including a plurality of nozzles;
a main scanning driving mechanism that performs main scanning pass for forming dots on a recording medium while relatively moving the recording head and the recording medium in a main scanning direction;
a sub-scanning driving mechanism that performs sub-scanning for relatively moving the recording medium and the recording head in a sub-scanning direction intersected with the main scanning direction; and
a controller that controls the recording head, the main scanning driving mechanism, and the sub-scanning driving mechanism,
the controller performing multi-pass recording through which recording of dots is terminated in main scanning passes of N times (N is an integer equal to or greater than two) on a main scanning line,
the multi-pass recording being performed for respective supercell regions defined as a region including pixel positions on which recording of dots is performed in each main pass,
all boundary lines of two supercell regions adjacent to each other among the supercell regions being parallel to one of the main scanning direction and the sub-scanning direction,
a first supercell region recorded in a first pass in the supercell regions being configured with a first concave polygon having a concave portion and a convex portion, the concave portion being concaved in an opposite direction opposite the main scanning direction, the convex portion being convexed in the opposite direction, at least a portion of a most inner part of the concave portion of the first supercell region and at least a portion of a most outer part of the convex portion of the first supercell region being overlapped to each other as viewed in the main scanning direction, a second supercell region recorded in a second pass in the supercell regions being configured with a second concave polygon having a concave portion and a convex portion, the concave portion being concaved in the main scanning direction, the convex portion being convexed in the main scanning direction, at least a portion of a most inner part of the concave portion of the second supercell region and at least a portion of a most outer part of the convex portion of the second supercell region being overlapped to each other as viewed in the main scanning direction, and shapes of the first concave polygon and the second concave polygon being inversely symmetrical shapes in the main scanning direction.

4. The dot recording apparatus according to claim 3, wherein the first concave polygon and the second concave polygon have the same shape.

\* \* \* \* \*